June 10, 1930.     J. M. McCLATCHIE     1,763,313
VALVE FOR HOMOGENIZING DEVICES
Filed March 21, 1928
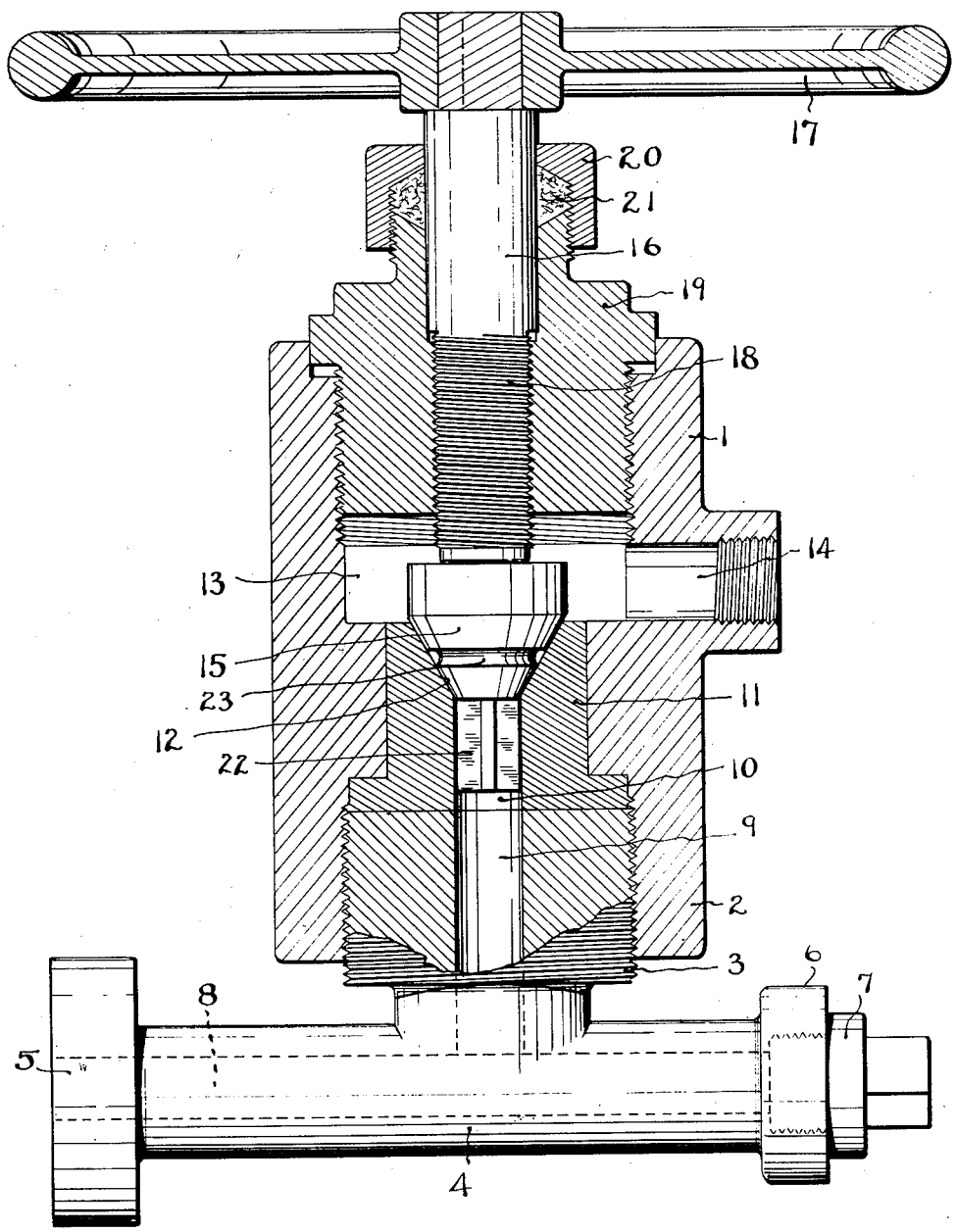
INVENTOR
John M. McClatchie
BY Archibald Cox
ATTORNEY Patented June 10, 1930

1,763,313

UNITED STATES PATENT OFFICE

JOHN M. McCLATCHIE, OF NEW YORK, N. Y., ASSIGNOR TO THE BORDEN COMPANY, OF NEW YORK, N. Y., A CORPORATION OF NEW JERSEY

VALVE FOR HOMOGENIZING DEVICES

Application filed March 21, 1928. Serial No. 263,337.

The invention relates to an improvement in valves for homogenizing devices.

Homogenizing devices are commonly employed for breaking up the butter fat globules of milk in the evaporated milk industry. Such devices usually consist of a valve, frequently conical, means for holding the movable part of the valve at a predetermined distance from or in a predetermined position relatively to the valve seat, and a high pressure pump for forcing the milk through the aperture between the adjacent valve surfaces. Before canning the evaporated milk it is forced through the homogenizer to break up the butter fat globules and prevent them from rising to the top of the milk when the evaporated milk has been canned. Failure to properly homogenize the milk results in a separation of the unbroken butter fat globules from the remainder of the canned milk and the rising of these unbroken globules to the top of the can when the can is left standing for any considerable period. To assure proper homogenization of the milk, the milk is sometimes passed through the homogenizing device twice. Another expedient is to provide the homogenizing device with two valves in series. To force the milk through these two valves successively requires a considerably greater power consumption than the use of a single valve. The object of the present invention is to produce a homogenizing device provided with a single valve which will operate fully as effectively, that is, have the same homogenizing effect upon the milk as passing the milk twice through a valve of usual construction or passing it through a device provided with two valves in series. To this end the invention consists in the improved valve hereinafter described and particularly pointed out in the appended claims.

The accompanying drawing is a vertical longitudinal section through a homogenizing valve of usual construction embodying the improvements of the present invention. The valve as illustrated comprises a vertically arranged cylindrical casing 1 having a threaded lower end 2 into which is screwed the threaded part 3 of a T-shaped inlet attachment 4. The end 5 of the attachment 4 is adapted to be connected with the high pressure pump for forcing the milk or other fluid through the valve. The end 6 of the attachment 4 is closed by a plug 7. The attachment 4 is provided with an axial bore 8, and the part 3 is provided with an axial bore 9 which communicates with the axial bore 10 of a bushing 11 in the upper part of which is formed an annular conical or tapered valve seat 12. The bore 10 communicates at its upper end with the space 13 formed in the upper part of the casing 1 and which discharges through the outlet 14.

The movable part of the valve, or valve proper, consists of the conical or tapered member 15 which is adapted to be held in a fixed position relatively to the tapered valve seat 12. The member 15 is carried by the lower end of a stem 16 on the outer end of which is fixed a hand wheel 17 for manipulating the valve and thereby regulating the position of the member 15 relatively to the valve seat 12. For this purpose the lower part 18 of the stem 16 is threaded and is received within a threaded bonnet 19 screwed into the threaded upper part of the casing 1. To prevent leakage past the stem 16 a gland 20 is provided which acts to compress the packing 21 surrounding the upper end of the stem. To assist in centering the valve member 15 accurately with respect to the valve seat 12 the lower end of the member 15 is provided with the guide piece 22 having longitudinally arranged vanes, the outer edges of which slide loosely in the bore 10 of the bushing 11.

In operation the handle 17 is turned until the valve member 15 is in a position relatively to the valve seat 12 to impart the requisite degree of fineness to the globules of butter fat contained in the milk forced through the valve structure. The milk or other fluid enters through the inlet 5 and flows axially or longitudinally of the coacting conical surfaces 15 and 12 and passes out through the outlet 14. It has been found by long experience that only the very hardest materials are adapted for this service, since longitudinal grooves are readily formed in the softer materials. And even when the very hardest materials are employed it has been found that with continued use minute longitudinal grooves are formed in the valve surfaces. This means that when a globule or globules of butter fat enter the lower end of these grooves they are forced through the grooves and pass out through the outlet 14 without being broken up. Consequently such butter fat globules will rise in the cans when the evaporated milk has been canned.

To prevent the formation of continuous longitudinal grooves in the coacting surfaces of the valve member 15 and the valve seat 12 I provide in the valve member 15 a circumferential groove 23. The groove 23 is located about half way in the tapered surface of the member 15, thus dividing the adjacent coacting surfaces of the valve member 15 and the valve seat 12 into two separate and distinct areas both of which function to break up the butter fat globules of the milk flowing past them. When the fluid which has passed the lower valve area reaches the groove 23 it swirls around the concaved walls of the groove and its direction of travel is changed. It then passes out of the valve through the upper valve area defined by the upper part of the valve member 15 and the upper part of the valve seat 12 beyond the groove 23. As a matter of fact, it has been found by repeated experiments that providing one of the valve members 15 or 12 with a circumferential groove, or providing them both with cooperating grooves has the same effect as passing the milk through an ordinary homogenizing valve twice or through two homogenizing valves arranged in series and at a great reduction in cost of operation. Even if longitudinal grooves are formed in the lower valve area they are not likely to continue in a straight line in the upper valve area. Hence a globule of butter fat which has passed through a groove in the lower valve area and has not been broken up will in most instances pass through the upper valve area at a point at which there is no groove and so be properly broken up.

Having thus described the invention what I claim as new is:—

1. A valve for homogenizing devices comprising, a casing having a passageway therethrough, a tapered annular valve seat located in the passageway, and a tapered valve member adapted to seat against the valve seat to control the flow of fluid through the passageway, the fluid flowing longitudinally of and between the adjacent surfaces of the valve seat and the valve member, said valve member being provided with an annular groove interrupting the continuous flow of fluid between the adjacent valve surfaces and dividing the valve surfaces into two separate areas.

2. A valve for homogenizing devices comprising a casing having a passageway therethrough, a valve seat located in the passageway, and a movable valve member adapted to seat against the valve seat to control the flow of fluid through the passageway, the fluid flowing longitudinally of and between the adjacent surfaces of the valve seat and of the movable valve member, said movable valve member being provided with a groove arranged transversely across the flow of fluid between the valve seat and the movable member to divide the valve seat and the valve member into two distinct valve areas separated by the groove.

3. A valve for homogenizing devices comprising, a casing having a passageway therethrough, a fixed tapered annular valve member located in the passageway, and a movable tapered valve member adapted to seat against the fixed valve member to control the flow of fluid through the passageway, the fluid flowing longitudinally of and between the adjacent surfaces of the fixed valve member and the movable valve member, one of said valve members being provided with an annular groove interrupting the continuous flow of fluid between the adjacent valve surfaces and dividing the valve surfaces into two separate areas.

JOHN M. McCLATCHIE.